United States Patent
Kato et al.

(10) Patent No.: US 8,179,554 B2
(45) Date of Patent: May 15, 2012

(54) PRINTER, CONTROL METHOD OF A PRINTER AND COMPUTER-READABLE RECORDING MEDIUM

(75) Inventors: Takao Kato, Nagoya (JP); Naoki Tanjima, Nisshin (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 750 days.

(21) Appl. No.: 12/288,816

(22) Filed: Oct. 23, 2008

(65) Prior Publication Data

US 2009/0109486 A1   Apr. 30, 2009

(30) Foreign Application Priority Data

Oct. 24, 2007  (JP) ................. 2007-275875

(51) Int. Cl.
*G06K 15/00* (2006.01)

(52) U.S. Cl. ............ 358/1.16; 358/1.14; 358/1.13; 710/313

(58) Field of Classification Search ........... 358/1.16, 358/1.14, 1.13; 710/313
See application file for complete search history.

(56) References Cited

U.S. PATENT DOCUMENTS

| 7,028,173 | B2* | 4/2006 | Shizuka et al. | 713/1 |
| 7,200,685 | B2* | 4/2007 | Uemura | 710/2 |
| 2007/0104525 | A1* | 5/2007 | Isshiki | 400/62 |
| 2007/0109322 | A1 | 5/2007 | Miyata | |
| 2007/0112997 | A1* | 5/2007 | Watanabe | 710/313 |

FOREIGN PATENT DOCUMENTS

| JP | 5265825 | 10/1993 |
| JP | 2007140597 | 6/2007 |

* cited by examiner

*Primary Examiner* — King Poon
*Assistant Examiner* — Allen H Nguyen
(74) *Attorney, Agent, or Firm* — Day Pitney LLP

(57) ABSTRACT

In a printer, when a file is received from a personal computer connected by way of a USB port, an ordinary storage region in a FLASH ROM is recognized as a removable drive by the personal computer, which disables the writing management by a management table for managing the writing operation into the ordinary storage region in the FLASH ROM by USB standard, the received file is stored in a temporary storage region in a RAM, the attribute of the received file is determined, and when the received file is a printing file, the received file is transferred from the temporary storage region in the RAM, and written into a position in a printing memory layout region in the FLASH ROM obtained by referring to an address table.

9 Claims, 3 Drawing Sheets

PRINTER, CONTROL METHOD OF A PRINTER AND COMPUTER-READABLE RECORDING MEDIUM

CROSS-REFERENCE TO RELATED APPLICATIONS

The present application claims priority from Japanese Patent Application No. 2007-275875, filed on Oct. 24, 2007, the disclosure of which is herein incorporated by reference in its entirety.

TECHNICAL FIELD

The disclosure relates to a printer to be connected to a host by way of a USB.

BACKGROUND

Hitherto, in a personal computer, when connecting a printer which the personal computer's OS does not support by standard, a device driver of the printer is installed in the personal computer.

When the device driver of the printer is installed, it is interposed between the editor of the personal computer and its printer, and the edited data created by the editor of the personal computer is output to the printer while it is converted into a data format suited to the printer, which is the output destination. As a result, the edited data created by the editor of the personal computer can be printed by the printer (see, for example, Japanese Patent Application Laid-Open No. 2007-140597).

Therefore, when printing is attempted by a printer which is not supported by the OS of the personal computer, a device driver of the printer is needed, and the device driver must be installed in the personal computer.

On the other hand, recently, the concern about security is heightening, an administrator is allocated for each information system, and the device driver cannot be installed in many cases without permission of the administrator. In the present situation not allowing installation of the device driver easily in a personal computer, if the edited data is the matter created by the editor of the same personal computer, a tremendous labor is needed to print by the personal computer in which the device driver is not installed.

In particular, if the printer is of a portable type, its features are sacrificed, and such a situation is giving a bad impression to the users in the present market filled with user-friendly products.

SUMMARY

Accordingly, the disclosure has been made in light of the above, and it is an object of the disclosure to provide a printer capable of printing from a host in which a device driver is not installed.

To achieve the object of the disclosure, there is provided a printer comprising: a first memory having a temporary storage region; a USB port; a second memory having an ordinary storage region; a management table disposed in the second memory for causing a host connected to the USB port to recognize that the ordinary storage region in the second memory is a removable drive, and managing the writing operation into the ordinary storage region in the second memory; an address table disposed in the second memory for allocating the ordinary storage region in the second memory depending on the type of the file; a printing memory layout region fixed and assigned in part of the ordinary storage region in the second memory by the address table; printing devices for printing the data written in the printing memory layout region; and a processor for controlling the printing devices, the first memory and the second memory, and controlling the following steps (a) to (d) upon receiving files from the host: (a) disabling the writing management by the management table; (b) storing the file in the temporary storage region in the first memory; (c) determining the attribute of the file; and (d) when the file is a printing file, transferring the file from the temporary storage region in the first memory, and writing into the position of the printing memory layout region in the second memory obtained by referring to the address table.

Furthermore, according to another aspect, there is provided a control method of a printer, wherein the printer comprises: a first memory having a temporary storage region; a USB port; a second memory having an ordinary storage region; a management table disposed in the second memory for causing a host connected to the USB port to recognize that the ordinary storage region in the second memory is a removable drive, and managing the writing operation into the ordinary storage region in the second memory; an address table disposed in the second memory for allocating the ordinary storage region in the second memory depending on the type of the file; a printing memory layout region fixed and assigned in part of the ordinary storage region in the second memory by the address table; and printing devices for printing the data written in the printing memory layout region; wherein the control method of the printer includes the following control of steps (a) to (d):(a) a step of disabling the writing management by the management table upon receiving files from the host; (b) a step of storing the file in the temporary storage region in the first memory; (c) a step of determining the attribute of the file; and (d) when the file is a printing file, a step of transferring the file from the temporary storage region in the first memory, and a step of writing into the position of the printing memory layout region in the second memory obtained by referring to the address table.

Furthermore, according to another aspect, there is provided a computer-readable recording medium storing a control program of a printer, wherein the printer comprises: a first memory having a temporary storage region; a USB port; a second memory having an ordinary storage region; a management table disposed in the second memory for causing a host connected to the USB port to recognize that the ordinary storage region in the second memory is a removable drive, and managing the writing operation into the ordinary storage region in the second memory; an address table disposed in the second memory for allocating the ordinary storage region in the second memory depending on the type of the file; a printing memory layout region fixed and assigned in part of the ordinary storage region in the second memory by the address table; and printing devices for printing the data written in the printing memory layout region; wherein the program includes the following instruction (a) to (d):(a) instruction of disabling the writing management by the management table upon receiving files from the host; (b) instruction of storing the file in the temporary storage region in the first memory; (c) instruction of determining the attribute of the file; and (d) when the file is a printing file, instruction of transferring the file from the temporary storage region in the first memory, and instruction of writing into the position of the printing memory layout region in the second memory obtained by referring to the address table.

DETAILED DESCRIPTION

[1. System Configuration of the Disclosure]

Figure 2:
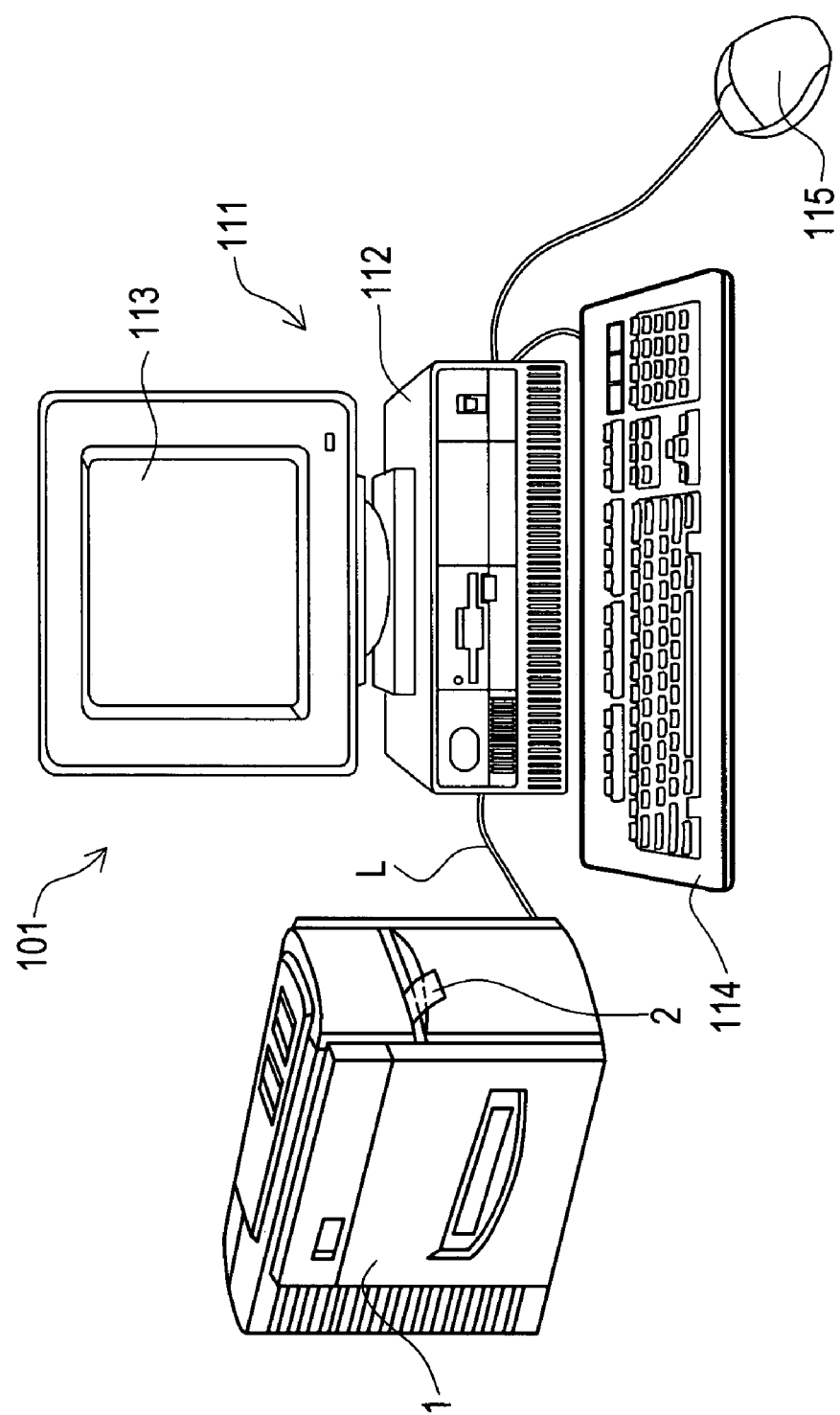
FIG. 2 is a view showing the printer connected to a personal computer.

An embodiment of the disclosure is described below with reference to the accompanying drawings. FIG. 2 shows a printer 1 of one embodiment of the disclosure connected to a personal computer 111. As shown in FIG. 2, the printer 1 of the embodiment is configured by being connected to the personal computer 111 by way of a USB cable L. Thereby the printing system 101 is constituted. In this regard, the printer 1 of the embodiment is a so-called label printer for printing on a printing tape 2. The printer 1 of the embodiment is such a compact size as to be placed on an office desk or the like and thus being portable. The personal computer 111 is a host of the printing system 101, and is a desktop computer including a main body 112, a display 113, a keyboard 114, a mouse 115, and others.

[2. Internal Configuration of the Disclosure]

Figure 3:
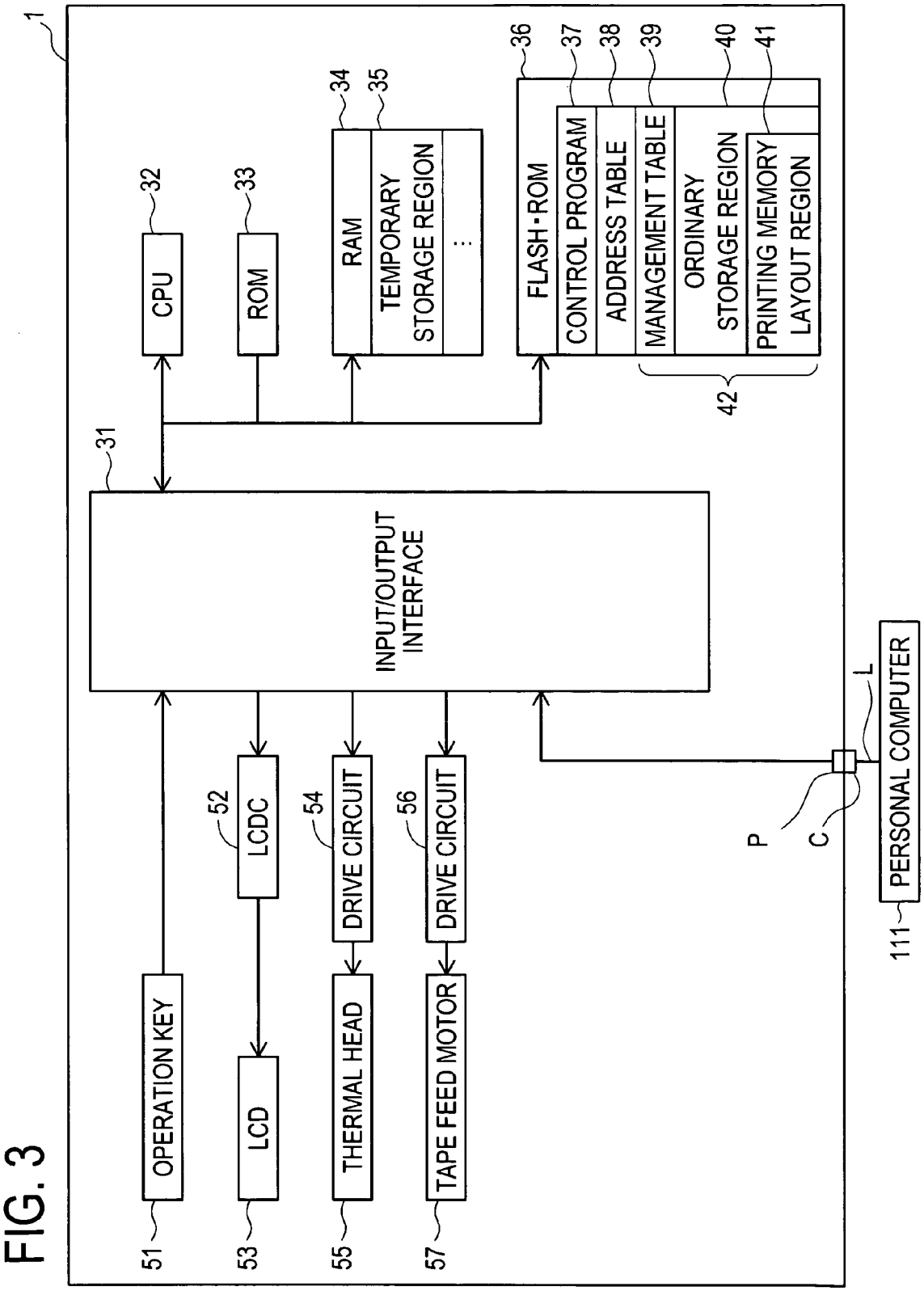
FIG. 3 is a block diagram showing the internal configuration of the printer.

The internal configuration of the printer 1 of the embodiment is described with reference to FIG. 3. FIG. 3 is a block diagram showing the internal configuration of the printer 1 of the embodiment.

As shown in FIG. 3, the printer 1 of the embodiment includes an operation key 51, a display controller (hereinafter, referred to as a LCDC) 52, two drive circuits 54 and 56, a USB port P, and others connected to an input/output interface 31.

The operation key 51 is operated by a user to input control signals for causing various desired operations to a CPU 32. The LCDC 52 has a LCD 53 connected thereto, and this LCD 53 is provided with a display RAM for displaying display data. The drive circuit 54 is connected with a thermal head 55, and drives the thermal head 55 when printing print data on a printing tape 2. The drive circuit 56 is connected with a tape feed motor 57, and drives this tape feed motor 57 when discharging the printing tape 2 to outside.

A connector C of the USB cable L is attached to and detached from the USB port P. When the connector C of the USB cable L is inserted into this USB port P, the personal computer 111 can be connected to the printer 1 of the embodiment by USB connection.

In the printer 1 of the embodiment, the CPU 32, a ROM 33, a RAM 34, a FLASH ROM 36 and others are connected to the input/output interface 31.

The CPU 32 is for executing the programs and others described below, and includes a built-in cache memory and others in which control programs other than those for printing are stored.

By executing a control program 37 described below, the CPU 32 can operate the drive circuits 54 and 56 to discharge the printing tape 2 to outside while printing on the printing tape 2 the data stored in a printing memory layout region 41 described below. The two drive circuits 54 and 56, the thermal head 55, the tape feed motor 57 and others constitute "a printing device".

The ROM 33 is stored control programs other than those for printing. The RAM 34 has a temporary storage region 35 and others, and provides a working region when executing various control programs by the CPU 32.

The FLASH ROM 36 is stored the control program 37 relating to printing, an address table 38, a management table 39 and others, and is further provided with an ordinary storage region 40, the printing memory layout region 41 and others.

The address table 38 allocates the storing positions in the ordinary storage region 40 in the FLASH ROM 36 according to the type of the file.

The management table 39 manages the writing into the ordinary storage region 40 in the FLASH ROM 36 by USB standard, and causes the personal computer 111 connected to the USB port P to recognize that the ordinary storage region 40 in the FLASH ROM 36 is a removable drive.

The printing memory layout region 41 is a part of the ordinary storage region 40 in the FLASH ROM 36 fixed and assigned by the address table 38, into which a printing file is written.

Therefore, in the FLASH ROM 36, the management table 39, the ordinary storage region 40, and the printing memory layout region 41 function as a mass storage area 42 of USB standard.

[3. Writing Operation of the Disclosure]

Figure 1:
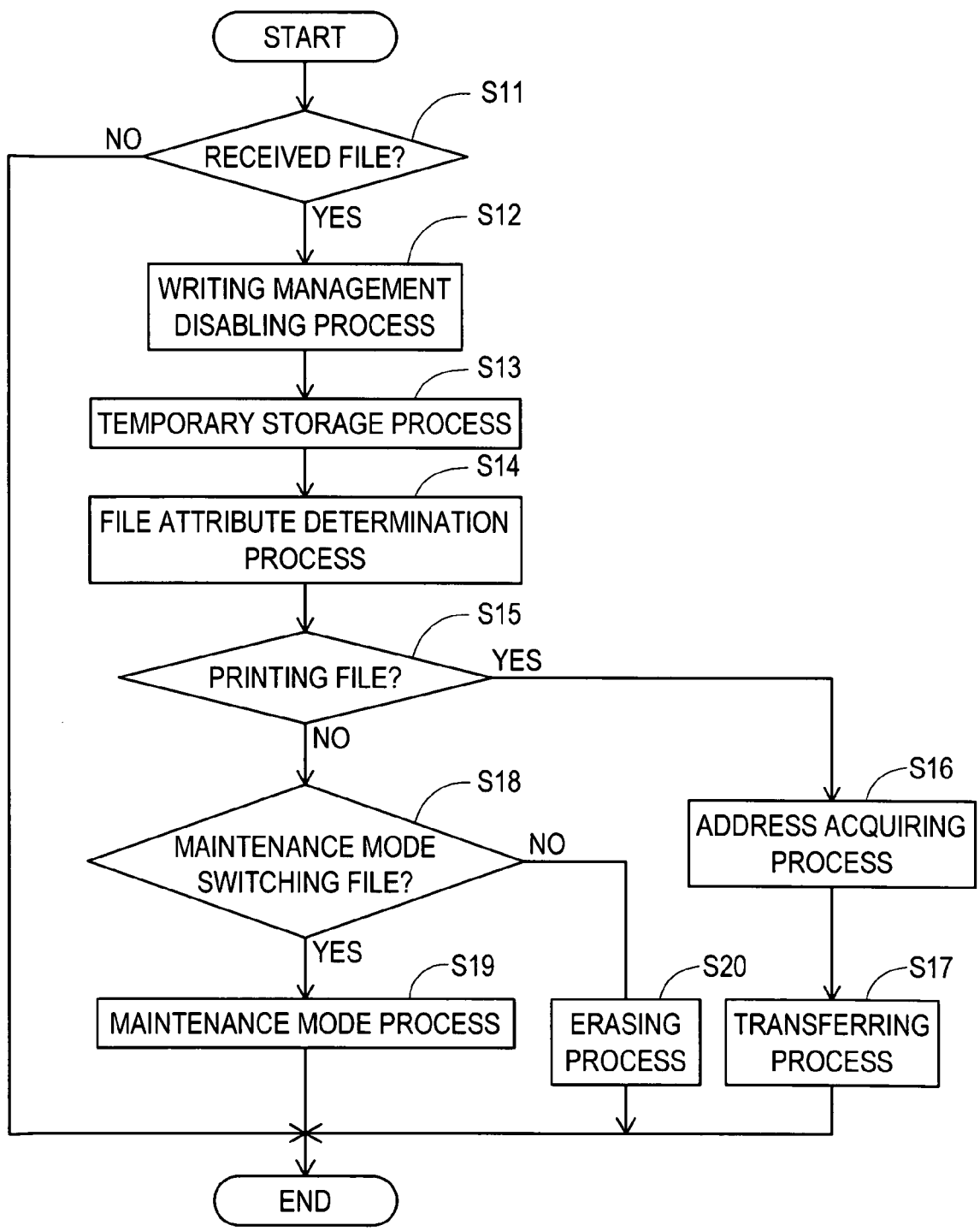
FIG. 1 is a flowchart of a program for controlling a writing operation of a printer according to one embodiment of the disclosure.

The writing operation of the printer 1 of the embodiment is described with reference to FIG. 1. FIG. 1 is a flowchart of a program for controlling the writing operation of the printer 1 of the embodiment. This program is stored in the ROM 33, and the CPU 32 reads the program into its own cache memory thereby to execute the program.

First, the CPU 32, at S11, determines whether or not a file is received from the personal computer 111. If a file is not received (No at S11), this program is terminated. If a file is received (Yes at S11), the process goes to S12.

At S12, the CPU 32 executes a writing management disabling process. In this writing management disabling process, the CPU 32 disables the writing management by the management table 39. As a result, the received file is liberated from the management by USB standard. The process then goes to S13.

At S13, the CPU 32 executes a temporary storage process. In this temporary storage process, the CPU 32 stores the received file in the temporary storage region 35 of the RAM 34. The process then goes to S14.

At S14, the CPU 32 executes a file attribute determination process. In this file attribute determination process, the CPU 32 determines the attribute of the received file. The determination is made, for example, on the basis of the header of the received file. The process then goes to S15.

At S15, the CPU 32 determines whether the received file is a printing file or not. The determination is made on the basis of the processing result at S14. When the received file is a printing file (Yes at S15), the process goes to S16.

At S16, the CPU 32 executes an address acquiring process. In this address acquiring process, the CPU 32 refers to the address table 38, and acquires a physical address of the printing memory layout region 41. The process then goes to S17.

At S17, the CPU 32 executes a transferring process. In this transfer process, the CPU 32 transfers the received file stored in the temporary storage region 35 of the RAM 34, and writes into the printing memory layout region 41 in the FLASH ROM 36 on the basis of the physical address acquired at S16. Then, this program is terminated. Afterwards, the CPU 32 executes the control program 37 relating to printing, and discharges the printing tape 2 to outside while printing the data of the received file stored in the printing memory layout region 41 on the printing tape 2.

If the received file is not a printing file (No at S15), the process advances to S18, where the CPU 32 determines whether the received file is a maintenance mode switching file or not. The determination is also made on the basis of the processing result at the S14. When the received file is a maintenance mode switching file (Yes at S18), the process goes to S19.

At S19, the CPU 32 executes a maintenance mode process. In the maintenance mode process, the CPU 32 sequentially updates the data in the FLASH ROM 36 by a rewriting data file sent from the personal computer 111 following the maintenance mode switching file which is the received file. At this time, the maintenance mode switching file is erased from the temporary storage region 35 of the RAM 34. The temporary storage region 35 of the RAM 34 functions as a buffer memory of the rewriting data file. This program is terminated. As a result, in the FLASH ROM 36, the control program 37, the address table 38, the management table 39 and others are updated.

If the received file is not maintenance mode switching file (No at S18), the process advances to S20, where the CPU 32 executes an erasing process. In this erasing process, the CPU 32 erases the received file stored in the temporary storage region 35 of the RAM 34. This program is then terminated.

[4. Summary]

As explained herein, in the printer 1 of the embodiment, the CPU 32 operates the drive circuits 54 and 56, and thereby discharges the printing tape 2 to outside while printing the data written in the printing memory layout region 41 in the FLASH ROM 36 on the printing tape 2.

In this respect, the printer 1 of the embodiment is configured as follows. When a file is received from the personal computer 111 connected through the USB port P (Yes at S11), the ordinary storage region 40 in the FLASH ROM 36 is recognized as a removable drive by the personal computer 111, and the writing management by the management table 39 for managing the writing operation into the ordinary storage region 40 in the FLASH ROM 36 by USB standard is disabled (S12). Then, the received file is stored in the temporary storage region 35 in the RAM 34 (S13), and the attribute of the received file is determined (S14). When the received file is a printing file (Yes at S15), the received file is transferred from the temporary storage region 35 in the RAM 34, and written into the position of the printing memory layout region 41 in the FLASH ROM 36 obtained by referring to the address table 38 (S16, S17). With this configuration, printing from the personal computer 111 is enabled even if the device driver is not installed in the personal computer 111.

From the standpoint of the personal computer 111, the printer 1 of the embodiment is recognized as a removable driver, that is, a device of USB mass storage class. Thus, by an ordinary access operation of sending the printing file to the drive allocated in the device, the data in the printing file can be printed by the printer 1 of the embodiment.

In the printer 1 of the embodiment, the CPU 32 disables the writing management by the management table 39 (S12). Accordingly, without executing any particular file management necessary in the USB mass storage class, the printing file is written into a fixed position in the printing memory layout region 41 in the FLASH ROM 36, so that the access to the printing file is fast.

In the printer 1 of the embodiment, moreover, when the file received from the personal computer 111 is a maintenance mode switching file (Yes at S18), the CPU 32 updates the data in the FLASH ROM 36 by a rewriting data file transmitted from the personal computer 111 following the maintenance mode switching file (S19). As a result, only by holding the USB connection with the personal computer 111, any particular input operation is not needed, and the system can be easily renewed by updating or upgrading.

In the printer 1 of the embodiment, when the file received from the personal computer 111 is not the maintenance mode switching file but a file that is not relating to the address table 38 (No at S18), the CPU 32 erases the received file from the temporary storage region 35 in the RAM 34 (S20). Therefore, unnecessary file can be eliminated, and system failure due to unnecessary file can be prevented effectively.

[5. Others]

The disclosure is not limited to the foregoing embodiment alone, but may be changed and modified within a scope not departing from the true spirit thereof.

For example, the printer 1 of the embodiment is a so-called label printer for printing on the printing tape 2, but it may also be substituted by a printer for printing on roll or sheet printing paper.

The personal computer 111 connected to the printer 1 of the embodiment by way of the USB port P is not particularly specified, and may include tower type, all-in-one type, notebook type personal computer or huge computer, or it may be connected to another personal computer by LAN or the like.

What is claimed is:

1. A printer comprising:
   a first memory having a temporary storage region;
   a USB port;
   a second memory having an ordinary storage region;
   a management table disposed in the second memory for causing a host connected to the USB port to recognize that the ordinary storage region in the second memory is a removable drive, and managing the writing operation into the ordinary storage region in the second memory;
   an address table disposed in the second memory for allocating the ordinary storage region in the second memory depending on the type of the file;
   a printing memory layout region fixed and assigned in part of the ordinary storage region in the second memory by the address table;
   printing devices for printing the data written in the printing memory layout region; and
   a processor for controlling the printing devices, the first memory and the second memory, and controlling the following steps (a) to (d) upon receiving files from the host:
   (a) disabling the writing management by the management table;
   (b) storing the file in the temporary storage region in the first memory;
   (c) determining the attribute of the file; and
   (d) when the file is a printing file, transferring the file from the temporary storage region in the first memory, and writing into the position of the printing memory layout region in the second memory obtained by referring to the address table.

2. The printer according to claim 1, wherein the processor further executes the control of step (e):
   (e) when the file is a maintenance mode switching file, updating the data in the second memory by a rewriting data file transmitted from the host following the maintenance mode switching file.

3. The printer according to claim 2, wherein the processor further executes the control of step (f):
   (f) when the file is other than the maintenance mode switching file and is a file not relating to the address table, erasing the file from the temporary storage region in the first memory.

4. A control method of a printer, wherein the printer comprises:
   a first memory having a temporary storage region;
   a USB port;
   a second memory having an ordinary storage region;
   a management table disposed in the second memory for causing a host connected to the USB port to recognize that the ordinary storage region in the second memory is a removable drive, and managing the writing operation into the ordinary storage region in the second memory;
   an address table disposed in the second memory for allocating the ordinary storage region in the second memory depending on the type of the file;
   a printing memory layout region fixed and assigned in part of the ordinary storage region in the second memory by the address table; and
   printing devices for printing the data written in the printing memory layout region;
   wherein the control method of the printer includes the following control of steps (a) to (d):
   (a) a step of disabling the writing management by the management table upon receiving files from the host;
   (b) a step of storing the file in the temporary storage region in the first memory;
   (c) a step of determining the attribute of the file; and
   (d) when the file is a printing file, a step of transferring the file from the temporary storage region in the first memory, and a step of writing into the position of the printing memory layout region in the second memory obtained by referring to the address table.

5. The control method of the printer according to claim 4, further including the following control of step (e):
   (e) when the file is a maintenance mode switching file, a step of updating the data in the second memory by a rewriting data file transmitted from the host following the maintenance mode switching file.

6. The control method of the printer according to claim 5, further including the following control of step (e):
   (f) when the file is other than the maintenance mode switching file and is a file not relating to the address table, a step of erasing the file from the temporary storage region in the first memory.

7. A non-transitory computer-readable recording medium storing a control program of a printer, wherein the printer comprises:
   a first memory having a temporary storage region;
   a USB port;
   a second memory having an ordinary storage region;
   a management table disposed in the second memory for causing a host connected to the USB port to recognize that the ordinary storage region in the second memory is a removable drive, and managing the writing operation into the ordinary storage region in the second memory;
   an address table disposed in the second memory for allocating the ordinary storage region in the second memory depending on the type of the file;
   a printing memory layout region fixed and assigned in part of the ordinary storage region in the second memory by the address table; and
   printing devices for printing the data written in the printing memory layout region;
   wherein the program includes the following instruction (a) to (d):
   (a) instruction of disabling the writing management by the management table upon receiving files from the host;
   (b) instruction of storing the file in the temporary storage region in the first memory;
   (c) instruction of determining the attribute of the file; and
   (d) when the file is a printing file, instruction of transferring the file from the temporary storage region in the first memory, and instruction of writing into the position of the printing memory layout region in the second memory obtained by referring to the address table.

8. The non-transitory computer-readable recording medium according to claim 7, wherein the program further includes the following instruction (e):
   (e) when the file is a maintenance mode switching file, instruction of updating the data in the second memory by a rewriting data file transmitted from the host following the maintenance mode switching file.

9. The non-transitory computer-readable recording medium according to claim 8, wherein the program further includes the following instruction (f):
   (f) when the file is other than the maintenance mode switching file and is a file not relating to the address table, instruction of erasing the file from the temporary storage region in the first memory.

* * * * *